(12) United States Patent
Reichel

(10) Patent No.: US 9,150,122 B2
(45) Date of Patent: Oct. 6, 2015

(54) VEHICLE SEAT, IN PARTICULAR UTILITY VEHICLE SEAT

(75) Inventor: Uwe Reichel, Kottweiler-Schwanden (DE)

(73) Assignee: Keiper GMBH & Co. KG, Kaiserslautern (DE)

( * ) Notice: Subject to any disclaimer, the term of this patent is extended or adjusted under 35 U.S.C. 154(b) by 280 days.

(21) Appl. No.: 13/821,964

(22) PCT Filed: Aug. 26, 2011

(86) PCT No.: PCT/EP2011/004303
§ 371 (c)(1),
(2), (4) Date: May 18, 2013

(87) PCT Pub. No.: WO2012/038021
PCT Pub. Date: Mar. 29, 2012

(65) Prior Publication Data
US 2013/0221717 A1    Aug. 29, 2013

(30) Foreign Application Priority Data

Sep. 22, 2010    (DE) .......................... 10 2010 046 799

(51) Int. Cl.
*B60N 2/50* (2006.01)
*B60N 2/02* (2006.01)
(Continued)

(52) U.S. Cl.
CPC *B60N 2/02* (2013.01); *B60N 2/162* (2013.01); *B60N 2/501* (2013.01); *B60N 2/505* (2013.01); *B60N 2/508* (2013.01); *B60N 2/525* (2013.01)

(58) Field of Classification Search
CPC ........ B60N 2/162; B60N 2/508; B60N 2/525; B60N 2/501; B60N 2/505; B60N 2/02

USPC ...................................... 297/344.16; 248/421
See application file for complete search history.

(56) References Cited

U.S. PATENT DOCUMENTS 4,213,594 A    7/1980    Pietsch et al.
4,645,169 A    2/1987    Mischer
(Continued)

FOREIGN PATENT DOCUMENTS

CN    2621984 Y    6/2004
DE    2849700 A1    5/1980
(Continued)

OTHER PUBLICATIONS

International Search Report for application No. PCT/EP2011/004303 mailed Oct. 7, 2011.
(Continued)

*Primary Examiner* — Anthony D Barfield
(74) *Attorney, Agent, or Firm* — Fletcher Yoder, P.C.

(57) ABSTRACT

A vehicle seat has a scissor-type stand vibratable and adjustable in height, with a pneumatic spring and cranks, intersecting at a scissor shaft. A control device for level control and for height adjustment of the stand has a control element, a valve device controlled by the control element, for controlling the spring, a switching element movable relative to the control element or the valve device, and a bearing. The control element and valve device are kinematically assigned to different parts of the stand movable relative to one another. The control element is linked to a first crank. The bearing is spaced from the shaft and connected with a second crank. The valve device is connected with the switching element movable relative to the control element.

9 Claims, 4 Drawing Sheets

Figure 1:
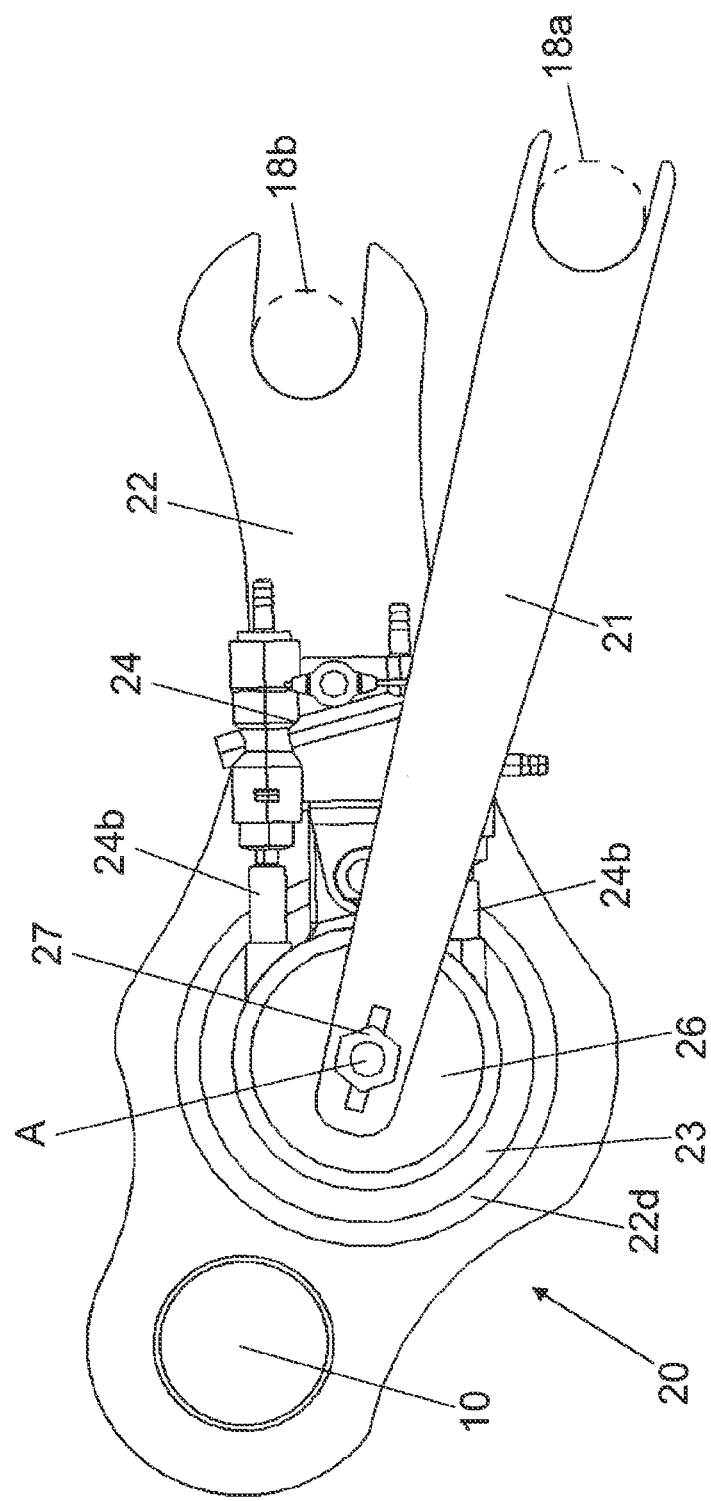

(51) Int. Cl.
 *B60N 2/16* (2006.01)
 *B60N 2/52* (2006.01)

(56) References Cited

U.S. PATENT DOCUMENTS

| | | | |
|---|---|---|---|
| 4,946,145 A * | 8/1990 | Kurabe | 297/344.16 |
| 5,533,703 A | 7/1996 | Grassl et al. | |
| 6,616,116 B1 * | 9/2003 | Rochau et al. | 248/421 |
| 7,712,836 B2 | 5/2010 | Deml | |
| 2008/0088165 A1 | 4/2008 | Deml | |
| 2009/0050220 A1 | 2/2009 | Kang | |

FOREIGN PATENT DOCUMENTS

| | | |
|---|---|---|
| DE | 3333604 A1 | 3/1985 |
| DE | 4335199 C1 | 5/1995 |
| DE | 102006017774 A1 | 10/2007 |

OTHER PUBLICATIONS

PCT Notification of Transmittal of Copies of Translation of the International Preliminary Report on Patentability mailed Apr. 4, 2013.

Chinese Office Action mailed Nov. 23, 2014.

* cited by examiner

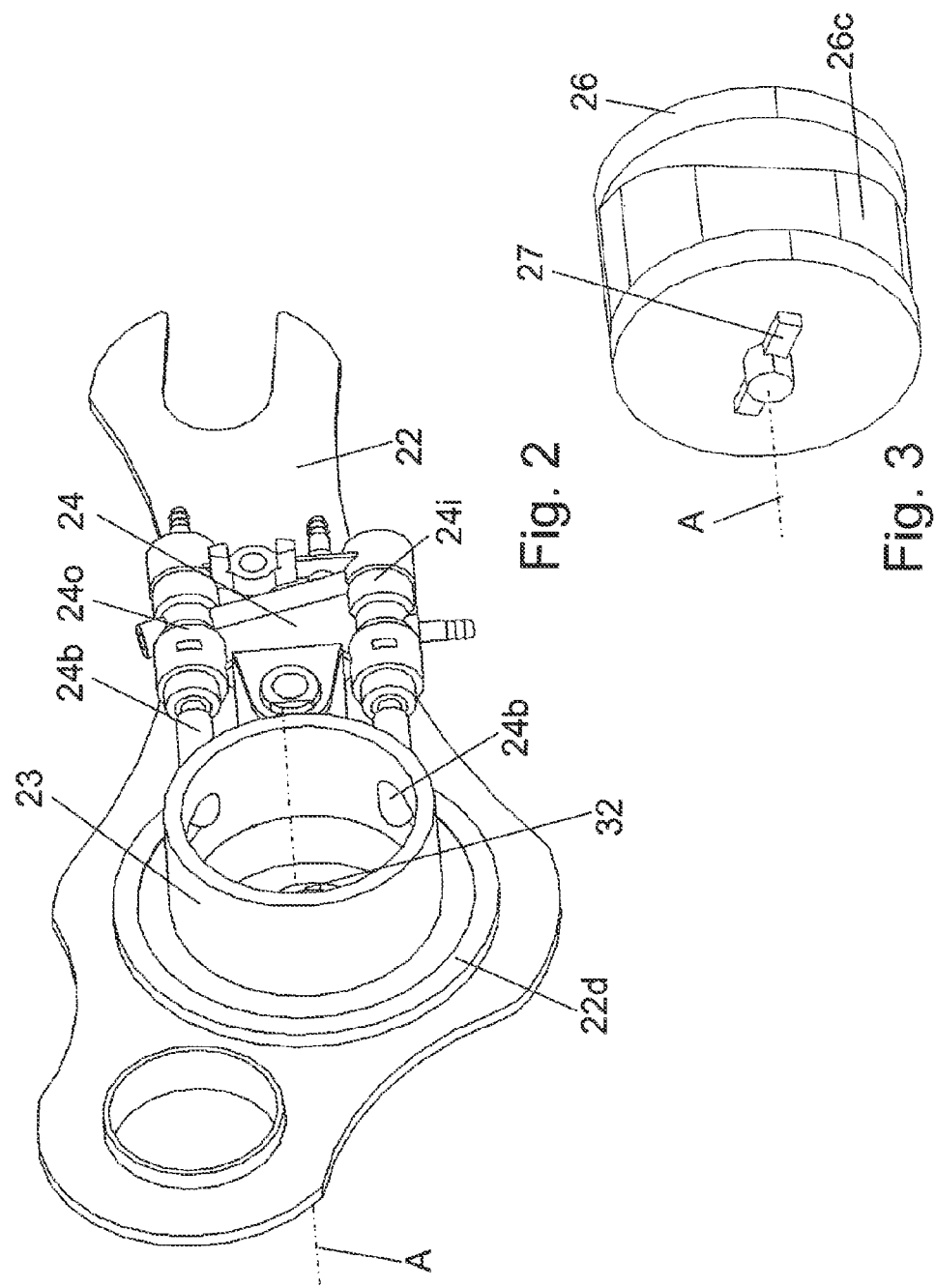

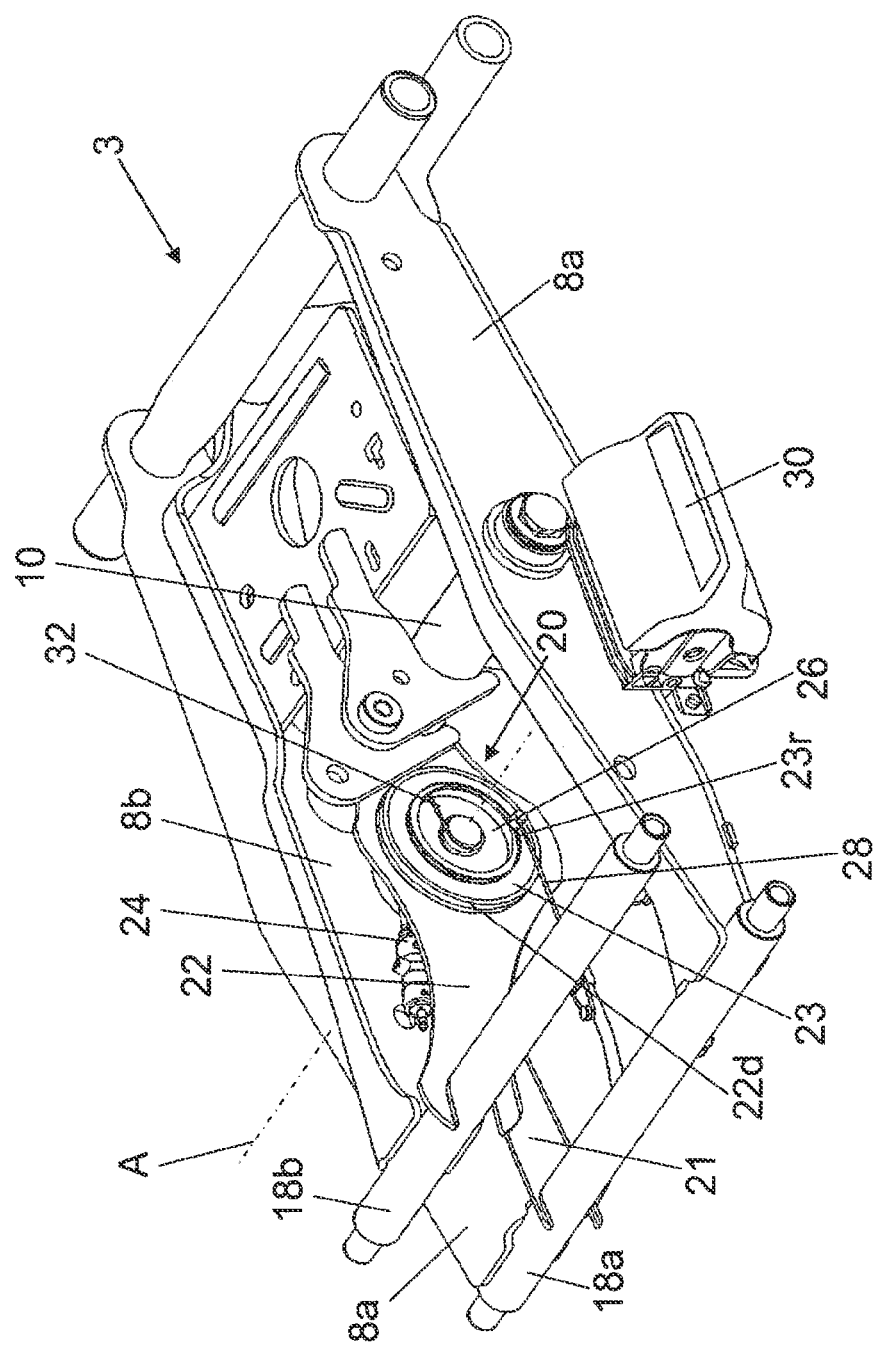

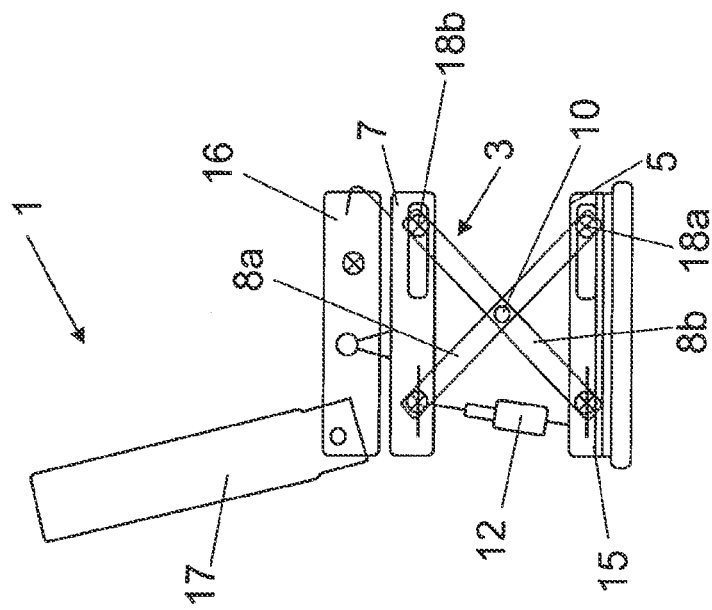

VEHICLE SEAT, IN PARTICULAR UTILITY VEHICLE SEAT

CROSS REFERENCE TO RELATED APPLICATIONS

This application claims priority from and the benefit of PCT Application No. PCT/EP2011/004303, filed on Aug. 26, 2011; and German Patent DE 10 2010 046 799.5, filed on Sep. 22, 2010; which are herein incorporated by reference.

BACKGROUND

The invention relates to a vehicle seat, in particular a utility vehicle seat, having the features of the generic term of claim 1.

DE 28 49 700 A1, DE 33 33 604 A1, DE 43 35 199 C1, U.S. Pat. No. 4,946,145 A or DE 10 2006 017 774 A1 describe known vehicle seats of this kind There is provided in each case for the level control a control circuit which comprises the scissor-type stand, the pneumatic spring and the control device including a control element, valve device and a switching element. The control element and the valve device are arranged on different parts of the vehicle seat which are movable relative to one another. If the actual value of height deviates from the desired value, generally owing to a deflection of the stand, the pneumatic spring is controlled in such a manner that it acts counter to the deflection, and the actual value again reaches the desired value. For the height adjustment, the desired value is modified by means of the switching element in accordance with the height which is to be newly adjusted, so that the level control treats the current actual value as a deviation from the desired value and moves the scissor-type stand to the desired new height. In the case of technical implementation, known vehicle seats have a partially complex structure. In addition, an increase in the precision of the level control and the height adjustment would also be desirable.

SUMMARY

The object of the invention is to improve a vehicle seat of the type mentioned in the introduction. This object is achieved according to the invention with a vehicle seat having the features of claim 1. The dependent claims relate to advantageous configurations.

The kinematic assignment of the control element to the first crank by means of the connecting link, and the connection of the valve device with the switching element, the bearing of which is connected with the second crank, makes possible both, level control by means of a relative movement of switching element and retained valve device, and a modification of the desired value for the height by moving the valve device by means of the switching element. The arrangement can take place at a site which is suitable with respect to the available building space and spaced apart from the scissor shaft.

Compared to other possible assignments to parts of the scissor-type stand, for example to the frames, the kinematic assignment according to the invention increases the detectable deflection of the vibration of the scissor-type stand and thus the measuring accuracy of the actual value of height, what ultimately improves both, level control and height adjustment. Kinematic assignment intends that the components which are kinematically assigned to one another move together, i.e. that they form a kinematic unit or assembly, what can be reached by fixed connections or by force-closed couplings.

DRAWINGS

The invention is explained in greater detail below with reference to an exemplary embodiment illustrated in the drawing, in which:

FIG. 1 shows a side view of a control device,
FIG. 2 shows the control device without control element,
FIG. 3 shows the control element of the control device,
FIG. 4 shows a perspective partial view of the scissor-type stand, and
FIG. 5 shows a schematic side view of a vehicle seat.FIG. 6

DETAILED DESCRIPTION

A vehicle seat 1 for a utility vehicle or another motor vehicle has a scissor-type stand 3 which comprises a lower frame 5, an upper frame 7 which is arranged thereabove and at each of the two sides a pair of intersecting cranks 8a and 8b, respectively. A scissor shaft 10 connects the two intersection points and at the same time defines the axis about which the cranks 8a and 8b can pivot relative to each other. The cranks 8a and 8b are in each case articulated at the rear end thereof to the lower frame 5 or to the upper frame 7 and in each case have at the front end thereof rotatable rollers, by means of which they are guided in or on the upper frame 7 and/or lower frame 5 so as to be able to be moved in the longitudinal direction of the seat. Owing to this movement of the cranks 8a and 8b, the height of the upper frame 7 above the lower frame 5 changes, hereinafter briefly referred to as the height of the scissor-type stand 3. Using a pneumatic spring 12 and preferably a damping device, the scissor-type stand 3 becomes a system which is able to vibrate and increases the seat comfort.

In the present case, the scissor-type stand 3 can be displaced in the longitudinal direction of the seat by means of seat rails 15, as a result of which the vehicle seat 1 is longitudinally adjustable, that is to say, the longitudinal position of its seat can be adjusted. The vehicle seat 1 further has a seat frame 16 which is articulated on the one hand at the rear region thereof to the upper frame 7 at both sides and, on the other hand, can be raised and lowered in the front region thereof by means of an inclination adjustment device and can consequently be adjusted in terms of inclination relative to the scissor-type stand 3. The vehicle seat 1 also has a backrest 17 which is fitted to the seat frame 16 (or alternatively to the upper frame 7), in the present case so as to be able to be adjusted in terms of inclination.

The two pairs of intersecting cranks 8a and 8b each comprise a first crank 8a which is arranged at the outer side and a second crank 8b which is arranged at the inner side. The first two cranks 8a are connected to each other at the ends thereof by means of transverse pipes. The second two cranks 8b, too, are connected to each other at the ends thereof by means of transverse pipes and, in the center thereof by means of the scissor shaft 10 which is configured as a pipe as well. The transverse pipes which are at the front in each case support the rollers. A transverse pipe of the first cranks, in the exemplary embodiment the transverse pipe which is at the front, is designated to be the first transverse pipe 18a, while a transverse pipe of the second cranks 8b, in the exemplary embodiment the transverse pipe which is at the front, is designated second transverse pipe 18b.

A control device 20 serves for both, level control, i.e. maintaining the adjusted height of the scissor-type stand 3 during vehicle operation, and for height adjustment of the scissor-type stand 3.

The control device 20 has a connecting link 21, which is kinematically assigned to the first cranks 8a, and a base 22 which is kinematically assigned to the second cranks 8b. In the exemplary embodiment, the base 22 is supported at one end on the scissor shaft 10, for which purpose the base 22 is provided with a bearing eye and, on the other end, it is fixed in a form-fit manner on the second transverse pipe 18b, for which purpose the base 22 is provided with a bearing bracket. Alternatively, the base 22 is fixed at one end or at both ends directly to one or both second cranks 8b.

At a distance to the scissor axis 10, the base 22 has a bearing 22d in the form of a hollow-cylindrical bearing bush, which defines an axis A which is parallel to the scissor shaft 10. The bearing 22d, which is connected with the second cranks 8b, axially protrudes on both sides from the plate-shaped part of the base 22, which extends between the scissor shaft 10 and the second transverse pipe 18b. An approximately hollow-cylindrical switching element 23 is rotatably mounted about the axis A in the bearing 22d. The switching element 23 axially protrudes from the bearing 22d (with respect to the axis A) on both sides.

The housing of a valve device 24 which radially protrudes from the switching element 23 with respect to the axis A is fixedly connected with the switching element 23. The valve device 24 is provided with two valves for controlling the pneumatic spring 12, namely an inlet valve 24i and an outlet valve 24o. So-called seated-type valves or slider valves can be considered as valve types. For either of the two valves, a movable tappet 24b protrudes from the housing of the valve device 24. By controlling (i.e. acting upon) the tappet 24b, the assigned valve can be actuated. The tappets 24b protrude through corresponding openings of the switching element 23 into the interior of the (hollow) switching element 23.

A control element 26 is rotatably mounted in the interior of the switching element 23, i.e. the control element 26, the switching element 23 and the bearing 22d are arranged radially one inside the other (with respect to the axis A). The control element 26 has a control slot 26c for cooperating with the tappets 24b of the valve device 24. The tappets 24b are not actuated in an initial position and are controlled, in the event of a rotation of the control element 26 relative to the switching element 23, depending on the course of the control slot. The control element 26 is connected at one front end—by means of a stroke compensating means 27—in a rotationally rigid manner with one end of the connecting link 21, while the connecting link 21, at the other end, is fixed to the first transverse pipe 18a in a form-fitting manner, for which purpose the connecting link 21 is provided with a bearing bracket. Since, in the event of a relative rotation of the cranks 8a and 8b about the scissor shaft 10, the connecting link follows the first cranks 8a, but describes another path (due to the spacing of the axis A from the scissor shaft 10), the stroke compensating means 27, in the present exemplary embodiment a slot in the connecting link 21 and an oblong cam at the control element 26, serves for stroke compensation for the connecting link 21. Alternatively, the bearing bracket on the end of the connecting link 21 can serve as a stroke compensating means.

The control device 20 further is provided with a cable 28 which is configured as a Bowden cable. The cable 28 is on one end connected with an actuating element 30 for the control device 20, which is arranged within the area of the seat frame 16 or of the upper frame 7. On the other end, the cable 28 is fixed to the switching element 23 and preferably partially wound about a cable roll 23r of the switching element 23. The jacket of the cable 28 can, for example, be fixed to the base 22 or to the second transverse pipe 18b. The cable roll 23r is preferably formed on the switching element 23, on the side of the base 22 which is opposed to the valve device 24, or at least connected thereto in a rotationally rigid manner. The cable roll 23r (and thus the switching element 23) is preferably pretensioned by means of a reset spring 32, for example a leg spring, with respect to the base 22 or the control element 26 in a sense of rotation, in which the the cable 28 is partially wound about the cable roll 23r. The switching element 30 is thus retained relative to the base 22 and thus to the second cranks 8b or relative to the control element 26.

Of the two functions of the control device 20, level control during use of the vehicle seat 1 acts as follows: In an initial position, the scissor-type stand 3 is adjusted at a certain height, for example in an upper position. Deflections of the scissor-type stand 3, which is able to vibrate, for example owing to an unevenness in the road surface, lead to the cranks 8a and 8b pivoting relative to each other. Since the switching element 23 is retained relative to the second cranks 8b, and the control element 26 follows the movement of the first cranks 8a, the control element 26 rotates relative to the switching element 23. The control slot 26c thus controls one of the two tappets 24b of the valve device 24—corresponding to the direction of deflection of the scissor-type stand 3 and consequently to the sense of rotation of the switching element 30. Depending on the direction of deflection, the pneumatic spring 12 is either aerated by means of the inlet valve 24i, or the pneumatic spring 12 is deaerated by means of the outlet valve 24o. This acts counter to the deflection then. The cranks 8a and 8b, the control device 20 and the pneumatic spring 12 form a control circuit, which controls the scissor-type stand 3 to the adjusted height as desired value.

The other function of the control device 20, i.e. height adjustment, acts as follows: In an initial position, the scissor-type stand 3 is adjusted at a certain height. An actuation of the actuating element 30 of the control device 20 moves the cable 28, i.e. the cable 28 is pulled, so that the cable 28 is partly wound off the cable roll 23r, or the cable 28 is released, so that the reset spring partially winds the cable 28 onto the cable roll 23r. The cable 28 thus rotates the switching element 23 (together with the valve device 24) in the bearing 22d, i.e. the switching element 23 moves relative (to the bearing 22d and) to the control element 26, the tappets 24b thus moving along the control slot 26c, and one of the two tappets 24b being controlled by the control slot 26c. This has the same effect as if the cranks 8a and 8b pivoted relative to one another, i.e. the valve device 24 is actuated, in order to counteract the supposed deflection. The control circuit now controls to the newly adjusted height as desired value.

The invention claimed is:
1. A vehicle seat, comprising:
a) a scissor-type stand, which is able to vibrate and which can be adjusted in height, and comprising a pneumatic spring and at least one pair of cranks, which intersect at a scissor shaft; and
b) a control device for level control and for height adjustment of the scissor-type stand, the control device comprising a control element, a valve device, which can be controlled by the control element, to control the pneumatic spring, a switching element, which is movable relative to the control element or to the valve device, and a bearing for the switching element, wherein the control element and the valve device are kinematically assigned to different parts of the scissor-type stand, the parts being movable relative to one another;

wherein the control element is linked, by a connecting link, to a first crank of the at least one pair of cranks, the bearing is spaced apart from the scissor shaft and connected with a second crank of the at lest one pair of cranks, and the valve device is connected with the switching element, which is movable relative to the control element;

wherein the bearing rotatably supports the switching element about an axis, and the swithching element rotatably supports the control element about the axis.

2. The vehicle seat according to claim 1, wherein the control element, the switching element and the bearing are arranged radially one inside the other with respect to the axis.

3. The vehicle seat according to claim 1, wherein the valve device comprises tappets, which to cooperate with the control element protrude in the interior of the switching element.

4. The vehicle seat according to claim 1, wherein the control element comprises a control slot, which, in the event of a relative rotation of the control element and the switching element, controls the valve device.

5. The vehicle seat according to claim 1, wherein the switching element comprises a roll onto which a cable can be partially wound and which is pretensioned.

6. The vehicle seat according to claim 5, wherein the switching element, relative to the axis, axially protrudes on both sides from the bearing, the valve device is arranged on one side of the switching element, and the cable roll is arranged on an opposed side of the switching element.

7. The vehicle seat according to claim 5, wherein the control device comprises an actuating element which moves the cable and thus rotates the switching element.

8. The vehicle seat according to claim 1, wherein the connecting link is connected to the first crank or a first transverse pipe between two first cranks which are fixedly connected with each other, the connecting link is connected to the control element, and the seat comprises a stroke compensating device.

9. The vehicle seat according to claim 1, wherein the control device has a base including the bearing, the base is connected with the second crank and/or a transverse pipe between two second cranks which are fixedly connected with one another, and the base is connected with the scissor-type stand.

* * * * *